United States Patent

[11] 3,625,627

| | | |
|---|---|---|
| [72] | Inventor | Robert W. Statzell<br>South Bend, Ind. |
| [21] | Appl. No. | 62,223 |
| [22] | Filed | Aug. 3, 1970 |
| [45] | Patented | Dec. 7, 1971 |
| [73] | Assignee | The Bendix Corporation |

[54] SPEED TO PRESSURE TRANSDUCER
10 Claims, 2 Drawing Figs.

[52] U.S. Cl. ............................................ 415/36,
73/521, 123/103 A
[51] Int. Cl. ............................................ F01d 3/02,
G01p 3/26, F02d 11/08
[50] Field of Search .......................... 415/36;
73/521; 123/103 A

[56] References Cited
UNITED STATES PATENTS

| | | | |
|---|---|---|---|
| 2,002,040 | 5/1935 | Mock | 73/521 X |
| 2,874,764 | 2/1959 | Booth et al. | 73/521 X |
| 2,935,076 | 5/1960 | Larges et al. | 123/103 (A) |
| 3,194,252 | 7/1965 | Locher, Jr. et al. | 123/103 X |
| 3,199,522 | 8/1965 | Cramer | 123/103 X |
| 3,538,775 | 11/1970 | Burke et al. | 73/521 X |
| 3,410,287 | 11/1968 | Van Der Heyden et al. | 73/521 X |

*Primary Examiner*—Leonard H. Gerin
*Attorneys*—Gordon H. Chenez and Plante, Hartz, Smith and Thompson ABSTRACT: A casing slidably carries a rotatable shaft and is provided with a fluid inlet connected to a source of pressurized fluid. A fluid pump or impeller connected to the shaft and actuated thereby receives fluid from the inlet and discharges the same at a higher pressure as a function of the rotational speed of the shaft to a passage having a fixed restriction and a variable area valve in series flow therein and connecting the pump inlet and outlet. A centrifugal weight rotated by the shaft is connected to the variable area valve to load the same in a closing direction in opposition to a force derived from the fluid pressure differential generated across the valve member. The fluid pressure differential across the valve member is vented to a pressure differential responsive member which provides a control force or position output as a function of the speed of rotation of the shaft. The slidable bearing surfaces supporting the shaft in the casing are vented to the passage upstream from the fixed restriction to provide fluid lubrication the pressure of which is proportional to shaft speed.

PATENTED DEC 7 1971

3,625,627

INVENTOR.
ROBERT W. STATZELL
BY
Gordon H. Cheney
AGENT

SPEED TO PRESSURE TRANSDUCER

BACKGROUND OF THE INVENTION

This invention pertains to energy transducing apparatus for converting mechanical movement such as speed of rotation of a shaft to a control fluid pressure or force.

In the control apparatus field, it may be necessary to sense a variable input signal such as rotational speed of an engine and convert the same to a control signal in variable form such as a force or fluid pressure, which may or may not be amplified, as a function of engine rotational speed. Various forms of transducer apparatus for producing such conversion have been proposed and are in use but, for various reasons which may include complexity, lack of reliability and/or accuracy, large size and/or weight as well as expense and maintenance problems are not entirely satisfactory. Reference is made to U.S. Pat. No. 3,469,771 issued Sept. 30, 1969, to W. Jurish for an example of a prior art transducer device.

It is an object of the present invention to provide transducer apparatus for reliable and accurate conversion of rotational speed to a fluid pressure or force which varies as a predetermined function of the rotational speed.

It is another object of the present invention to provide transducer apparatus for converting variable rotational speed of a member to a corresponding variable control fluid pressure or force for control purposes and wherein the variable control fluid under pressure is utilized to lubricate the rotating member thereby minimizing the frictional effect associated therewith.

It is an important object of the present invention to provide transducer apparatus for converting rotational speed of a rotating member to a fluid pressure or force as a predetermined function of the rotational speed and particularly adapted for high speed rotary members.

Other objects and advantages will be apparent from the following description taken with the accompanying drawing.

DESCRIPTION OF THE PREFERRED EMBODIMENT

Figure 1:
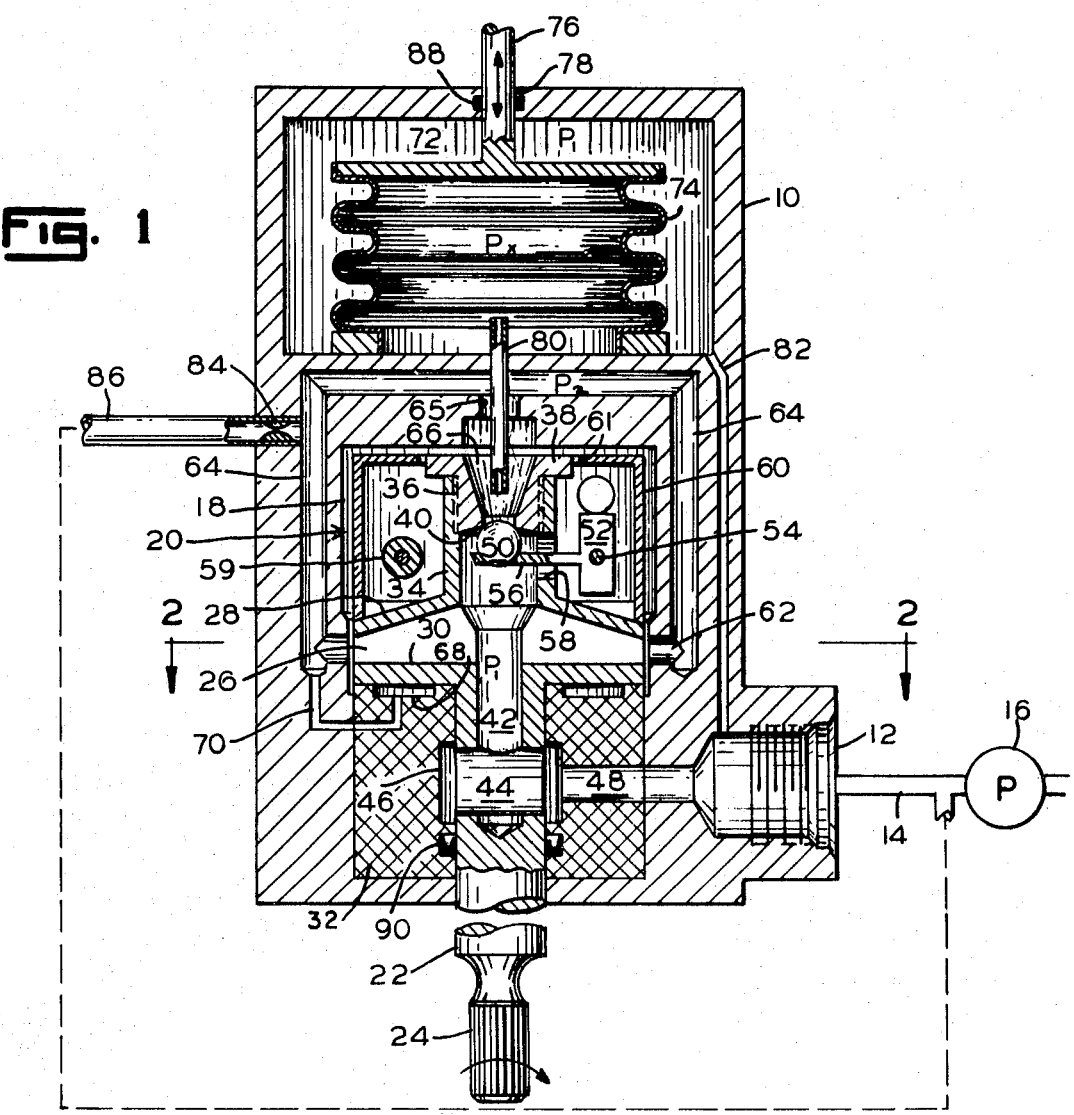
FIG. 1 is a cross section of a transducer embodying the present invention.
Figure 2:
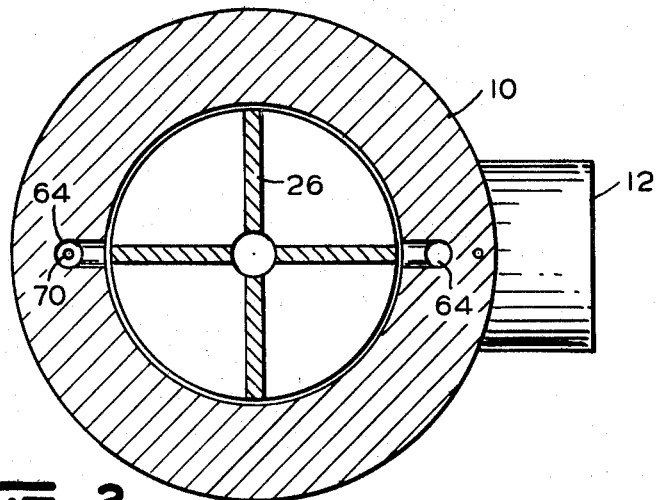
FIG. 2 is a section taken on line 2—2 of FIG. 1.

Numeral 10 designates a casing having an inlet port 12 connected via a passage 14 to a suitable source of pressurized fluid 16 which, in the preferred embodiment, may be fuel at pressure $P_1$ discharged by a fuel pump, not shown, of a conventional combustion engine fuel control network.

A cavity 18 formed in casing 10 is adapted to receive a rotatable assembly 20 having a shaft portion 22 provided with a splined end 24 by means of which the rotatable assembly 20 may be driven through conventional drive mechanism, not shown, in response to engine r.p.m. The rotatable assembly 20 includes a centrifugal pump vaned impeller 26 having spaced-apart radially extending upper and lower walls 28 and 30 which converge as shown. The lower wall 30 slidably bears against a bearing 32 which may be of carbon or other suitable material suitably secured in cavity 18 and preventing pressurized fuel leakage outwardly from cavity 18.

A tubular extension 34 extends axially from upper wall 28 and is provided with a threaded end portion 36 adapted to threadedly receive a plug 38 having a central orifice or opening defining a valve seat 40. The tubular extension 34 communicates with an axial bore 42 in shaft portion 22 which is further provided with a passage 44 communicating bore 42 with an annulus 46 in carbon bearing 32. A passage 48 communicates annulus 46 with inlet port 12.

A ball valve 50 seatable on valve seat 40 is secured to a centrifugal weight assembly which includes a weight 52 pivotally mounted on a fixed support 54 and having an arm 56 extending radially inwardly therefrom through an opening 58 in the wall of tubular extension 34 into engagement with ball valve 50. As the weight 52 pivots about the support 54 in response to the speed of rotation of shaft portion 22, the ball valve 50 is positioned accordingly relative to valve seat 40. The weight assembly is enclosed by a cover 60 suitably secured to upper wall 28 by any suitable means providing a fluid seal. A suitable conventional counterweight generally indicated by 59 is mounted to rotate with the weight 52 thereby providing an offset force to minimize the unbalance effect created by the use of a single weight 52. Obviously, the counterweight 59 is not necessary if two diametrically opposite centrifugal weights 52 are utilized. A central opening 61 in the end wall of cover 60 accommodates plug 38 which has a relatively close spaced-apart relationship with casing 10.

The vaned impeller 26 receives fuel at pressure $P_1$ via bore 42 and discharges fuel at relatively greater fuel pressure $P_2$ to an annular diffuser portion 62 in casing 10 wherein the kinetic energy of the fuel discharged from impeller 26 undergoes a change to a corresponding increased static fuel pressure. A plurality of passages 64 communicate diffuser portion 62 with a restricted port 65 which, in turn, is vented to a chamber 66 defined by plug 38 and adjacent casing 10. Fuel flow out of chamber 66 via valve seat 40 is controlled by ball valve 50.

An annular cavity 68 in carbon bearing 32 communicates with diffuser portion 62 via a passage 70 and conducts fuel at pressure $P_2$ to the underside or thrust face of wall 30 from which the pressurized fuel passes between shaft portion and carbon bearing 32 to annulus 46 at relatively lower pressure $P_1$. Thus, the adjacent rubbing surfaces of carbon bearing 32 and wall 30 as well as shaft portion 22 are continuously supplied fuel at pressure $P_2$ which increases as a function of increasing speed of rotation of impeller 26.

A chamber 72 defined by casing 10 contains a bellows 74 having one end fixedly secured to casing 10 by any suitable means providing sealed engagement and an opposite movable closed end secured to a rod 76 which slidably extends through an opening 78 in casing 10 to provide an output position signal external of casing 10. The interior of bellows 74 is vented to chamber 66 via a tube 80 fixedly secured in sealed engagement to casing 10 and extending through restricted port 65. The chamber 72 to which the exterior of bellows 74 is exposed is vented to inlet port 12 via a passage 82.

The passages 64 are vented via a restricted port 84 and passage 86 to fuel source 16 to vent a limited flow of fuel at pressure $P_2$ back to the source 16 for cooling purposes if desired.

The casing 10 is recessed adjacent rod 76 to accommodate a suitable fluid seal such as "O" ring 88. Likewise, carbon bearing 32 may be recessed to accommodate an "O" ring or other suitable seal 90 to prevent fluid leakage between shaft 22 and carbon bearing 32.

OPERATION OF THE PREFERRED EMBODIMENT

Assuming the rotatable assembly to be rotating, the pressure differential $P_1 - P_2$ generated by the impeller 26 is defined by the relationship $$P_1 - P_2 \text{ in p.s.i.} = (\Phi/2g)(r_o^2 - r_i^2) W^2$$

wherein $\Phi$ designates the density of the fluid or fuel in pounds per cubic inch, $g$ designates gravity in inches per second squared, $r_o$ designates the outside radius of impeller 26 in inches, $r_i$ designates the inside radius of impeller 26 in inches, and W designates speed of rotation of impeller 26 in radians per second.

Fuel at pressure $P_1$ passes to inlet of impeller 26. The fuel at pressure $P_2$ passes through restricted port 65 to chamber 66 thereby undergoing a pressure drop from $P_2$ to $P_x$ depending upon the effective flow area of valve seat 40 established by ball valve 50. The resulting $P_x - P_1$ pressure differential acts across ball valve 50 on the exposed area thereof to generate a force tending to balance the force output of centrifugal weight 52 in accordance with the relationship.

$$P_x - P_1 \text{ in p.s.i.} = KW^2/A_B$$

wherein K designates a constant derived from the weight, density and configuration of the centrifugal weight 52, W designates speed of rotation of centrifugal weight 52 in radians per second and $A_B$ designates area of the ball valve seat 40.

It will be recognized that the $P_x-P_1$ pressure differential is self regulating. When $(P_x-P_1)(A_B)$ is greater than the force output $KW_2$, the ball valve 50 is unbalanced away from seat 40 to increase flow out of chamber 66 causing a decrease in pressure $P_x$ to the extent required to balance the opposing force derived from centrifugal weight 52. Conversely, when $(P_x-P_1)(A_B)$ is less than $KW^2$ the ball valve 50 is unbalanced toward valve seat 40 to restrict flow out of chamber 66 thereby increasing pressure $P_x$ to the required extent.

Preferably, the ball valve 50 is prevented from seating on valve seat 40 by the pressure of the fuel in chamber 66 which pressure is more than adequate by design to overcome the opposing force of the centrifugal weight 52 over the expected operating range of the device. Furthermore, it will be recognized that the output fuel pressure $P_2$ generated by impeller 26 and the force output of centrifugal weight 52 are proportional to the square of speed such that the position of ball valve 50 relative to valve seat 40 for any given speed is substantially constant thereby minimizing any error due to the position of centrifugal weight 52.

The bellows 74 being exposed to the $P_x-P_1$ pressure differential responds thereto and expands or contracts as $P_x-P_1$ increases and decreases, respectively. The rod 76 being attached to the movable end of bellows 74 slides accordingly relative to casing 10 to provide an output position signal external of casing 10 for control purposes.

It will be recognized that the bellows 74 may be eliminated from casing 10 in which case the $P_x-P_1$ pressure differential would be vented externally of casing to suitable conventional control apparatus, not shown, responsive to the $P_x-P_1$ pressure differential.

What is claimed is:

1. Speed to pressure transducer apparatus comprising:
   a source of pressurized fluid;
   a rotatable member the speed of which is to be measured;
   fluid pressure generating means operatively connected to said rotatable member and actuated thereby and provided with an inlet connected to said source and an outlet for discharging said fluid at an increased pressure which varies as a function of the speed of said rotatable member;
   passage means connecting said outlet to said inlet;
   fluid pressure differential generating means including positionable valve means operatively connected to said passage means for controlling the effective flow area thereof;
   force producing means operatively connected to said rotatable member for generating a force which varies as a predetermined function of the speed of said rotatable member;
   said valve means being responsive to a first force derived from said fluid pressure differential generated thereby tending to open said valve means and an opposing force derived from said force producing means tending to close said valve means;
   said fluid pressure differential generated by said valve means varying as a predetermined function of the speed of said rotatable member.

2. Speed to pressure transducer apparatus as claimed in claim 1, wherein:
   said fluid pressure differential generating means includes a fluid restriction having a predetermined fixed flow area in series flow relationship with said positionable valve means.

3. Speed to pressure transducer apparatus as claimed in claim 1, wherein:
   said fluid pressure generating means is a centrifugal pump.

4. Speed to pressure transducer apparatus as claimed in claim 1, wherein:
   said force producing means is a centrifugal weight operatively connected to said positionable valve means for actuating the same.

5. Speed to pressure transducer apparatus as claimed in claim 3, wherein:
   said force producing means and said valve means are mounted on said centrifugal pump and rotatable therewith.

6. Speed to pressure transducer apparatus as claimed in claim 3 and further including:
   a casing housing said centrifugal pump;
   a bearing member fixedly secured to said casing and provided with a bearing surface slidably supporting said centrifugal pump;
   an annular cavity formed in said bearing surface;
   a passage connecting said outlet to said cavity for supplying pressurized fluid to the latter to establish fluid lubrication the pressure of which is proportional to the speed of rotation of said centrifugal pump.

7. Speed to pressure transducer apparatus as claimed in claim 1 and further including:
   a restricted passage connecting said passage means to said source for venting a limited quantity of pressurized fluid from said passage means for cooling purposes.

8. Speed to pressure transducer apparatus as claimed in claim 1 and further including:
   fluid pressure differential means having fluid connections to said passage means and responsive to said fluid pressure differential generated by said valve means for establishing a corresponding output position signal.

9. Speed to pressure transducer apparatus as claimed in claim 5, wherein:
   said passage means is partially defined by a tubular member secured to said centrifugal pump and rotatable therewith;
   said positionable valve means is defined by a valve seat member threadedly secured to said tubular member and a valve member movable relative to said seat.

10. Speed to pressure transducer apparatus as claimed in claim 4, wherein:
    said centrifugal weight is provided with an arm to which said positionable valve means is attached.

* * * * *